United States Patent [19]

Dartnall et al.

[11] Patent Number: 5,063,792
[45] Date of Patent: Nov. 12, 1991

[54] ROTARY/RECIPROCATORY MOTION CONVERTER

[75] Inventors: William J. Dartnall; David Langridge, both of Perth, Australia

[73] Assignee: Dartnall Engineering & Innovation Pty Ltd., Booragoon, Australia

[21] Appl. No.: 477,966
[22] PCT Filed: Jun. 14, 1988
[86] PCT No.: PCT/AU88/00190
§ 371 Date: May 15, 1990
§ 102(e) Date: May 15, 1990
[87] PCT Pub. No.: WO88/10381
PCT Pub. Date: Dec. 29, 1988

[30] Foreign Application Priority Data
Jun. 15, 1987 [AU] Australia ............... PI2498

[51] Int. Cl.$^5$ .................... F16H 19/06
[52] U.S. Cl. ........................ 74/37
[58] Field of Search ............... 74/37, 89.2

[56] References Cited
U.S. PATENT DOCUMENTS 1,848,530  3/1932  Hunter ............... 74/37
1,890,781  12/1932  Hall et al. ........... 74/37
2,564,816  8/1951  Rehwald ............. 74/37
2,593,470  4/1952  Matthews et al. ..... 74/37
4,084,681  4/1978  Heinzl et al. ........ 74/37

Primary Examiner—Allan D. Herrmann
Assistant Examiner—David W. Laub
Attorney, Agent, or Firm—Harness, Dickey & Pierce

[57] ABSTRACT

A continuous motion converter for converting rotary motion to reciprocatory motion and/or reciprocatory motion to rotary motion. A pair of wheels are positioned in a spaced co-planar relationship to each other and have an endless flexible drive member received over them. A carrier is located about the outer perimeter of the drive member. The drive member supports at one location thereon a slider which extends across the outer width of the drive member. The slider is slidably received on the carrier to extend to each side thereof for movement with the drive member and transverse movement relative to the axis extending between the wheels whereby with movement of the drive member over the wheels the carrier reciprocates between the wheels and the slider reciprocates transversely on the carrier, support means being provided to support the slider within the carrier continuously throughout movement of the carrier.

16 Claims, 8 Drawing Sheets

ROTARY/RECIPROCATORY MOTION CONVERTER

BACKGROUND OF THE INVENTION

This invention relates to a continuous motion converter for converting rotary motion to reciprocatory motion and/or reciprocatory motion to rotary motion.

Known means for effecting conversion of rotary motion to reciprocatory motion have utilised an endless flexible drive member such as a chain around a pair of spaced wheels where the chain supports a carrier which will move with the movement of the chain over the wheels. In most cases the carrier is supported to one side of the chain in order that it does not interfere with the support shafts of the wheels. Where the carrier is supported from both sides of the chain provision must be made to provide support at the side of the wheels to which the shafts are mounted when the position of the carrier fixed to the chain is in alignment with the shafts. This arrangement however, has also been found to be unsatisfactory since the other side of the carrier is not so supported and eccentric loadings are induced on the chain carrier and wheel.

SUMMARY OF THE INVENTION

In one form the invention resides in a continuous rotary to reciprocatory or reciprocatory to rotary motion converter comprising a pair of wheels in spaced co-planar relationship to each other having an endless flexible drive member received over them, a carrier located to both sides of the drive member, said drive member supporting at one location thereon a slider which extends to each side of the drive member, said slider being slidably received to the drive member carrier for transverse movement relative to the axis between said wheels whereby with movement of the drive member on rotation of said wheels, said carrier reciprocates between said wheels and said slider reciprocates transversely on the carrier, support means being provided to support slider at both sides of the drive member from the carrier continuously throughout the movement of the carrier.

According to a preferred feature of the invention the slider is engagable with the carrier to each side of the drive member through at least one roller rotatably supported from the slider and received in the carrier for said transverse movement.

The invention will be more fully understood in the light of the following description of several specific embodiments.

BRIEF DESCRIPTION OF THE DRAWINGS

FIG. 5 is a plan of one form of shaft mounting of the driven wheel of the second embodiment;

FIG. 6 is a sectional view along line 6—6 of FIG. 5; and

FIG. 7 is a sectional view along line 7—7 of FIG. 6;

FIG. 8 is a sectional view along line 8—8 of FIG. 6.

DETAILED DESCRIPTION OF THE PREFERRED EMBODIMENTS

Figure 1:
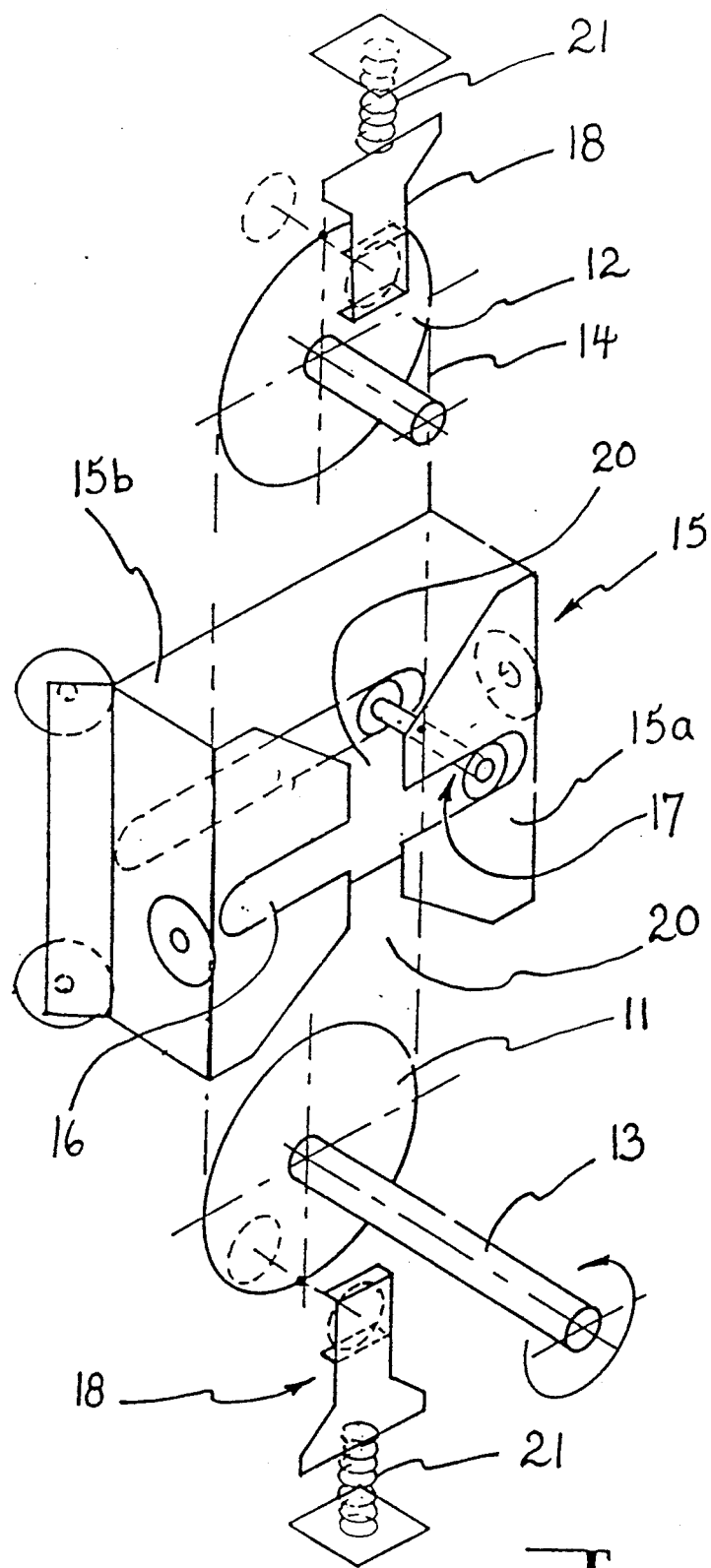
FIG. 1 is a schematic representation of a rotary to reciprocatory motion converter according to the first embodiment.

The first embodiment as shown at FIG. 1 comprises a pair of wheels 11 and 12 wherein one wheel 11 is driven from a rotary power source through a drive shaft 13 and the other wheel is freely rotatable on an idler shaft. Both wheels 11 and 12 are substantially co-planar and are interconnected by an endless flexible drive member 14 which is engaged with both wheels 11 and 12. The wheels 11 and 12 are associated with a housing body (not shown in FIG. 1) having a central axis which is substantially parallel with the perpendicular axis interconnecting the axes of rotation of the wheels 11 and 12. The housing body slidably supports a carrier 15 which extends transversely with respect to the central axis of the housing body and extends to both sides of the flexible drive member 14 to provide two parallel transversely extending side portions 15a and 15b. The opposed faces of the side portions 15a and 15b are formed with a transversely extending track 16. In the case of the embodiment the track takes the form of a slot extending through the walls of the side portions 15a and 15b however, if desired the track may be formed as a channel in the opposed faces of the side portions. The flexible drive member 14 supports at a point along its length a slider 17 which takes the form of a fixture with a protruding shaft fixed to the drive member and extending equally to each side of the drive member 14. The shaft supports a pair of rollers one at each end. Each roller is received in the slots 16 in the side portions 15a and 15b of the carrier. The side portion 15a of the carrier which is located to the side of the wheels 11 and 12 having the support shafts 13 for the wheels is formed with a gap 20 whereby on movement of the carrier 15 past the shaft the side portion can pass over the shaft by the gap moving past the shaft.

With rotation of the drive shaft 13 the driven wheel 11 is caused to rotate and the idler wheel 12 is caused to rotate through the presence of the flexible drive member 14. As a result of the movement of the flexible drive member 14 the slider 17 is carried in the direction of movement of the flexible drive member causing the carrier also to be moved. On the slider reaching one of the wheels it will be caused to move from one side of the wheel to the other, with continued rotation of the wheels and this transverse movement of the slider 17 is accommodated through the engagement of the rollers of the slider in the tracks 16 in each side portion 15a and 15b of the carrier. On the slider 17 reaching the other side of the wheel it will be carried in the opposite direction to that previously produced to take the carrier with it.

To prevent disengagement of the slider 17 from the track 16 of the one side portion 15a a pair of spaced guide members 18 are supported adjacent to each of the wheels 11 and 12 which serve to fill the gap 20 provided in the one side portion 15a when the carrier is at either of its end positions and provide a continuation of the track 16 in the one side portion 15a when the carrier 15 reaches its endmost positions and at the point that the slider 17 is located in the opening 20. In addition the guide members 18 are slidably supported from the housing body support (not shown) to be capable of limited axial movement. A biassing means 21 biasses the guide member 18 to a position slightly innermost of the end position of the carrier whereby on engagement by the carrier it will be carried to the end position. In addition in the event of there being some movement of the carrier beyond the end position as a result of inertial forces the guide member 18 is able to move accordingly with the carrier to ensure the slider is supported substantially equally to both sides of the drive member 14. In this case, the inward spring bias temporarily clamps the guides to the carrier and would accommodate any axial movement of the carrier as a result of inertial and/or gravitational forces and/or other forces in the end regions of the travel of the carrier which may cause the carrier to move axially away from the perimeter of the wheel. It should be appreciated that the biassing means 21 may take any desired form.

Figure 2:
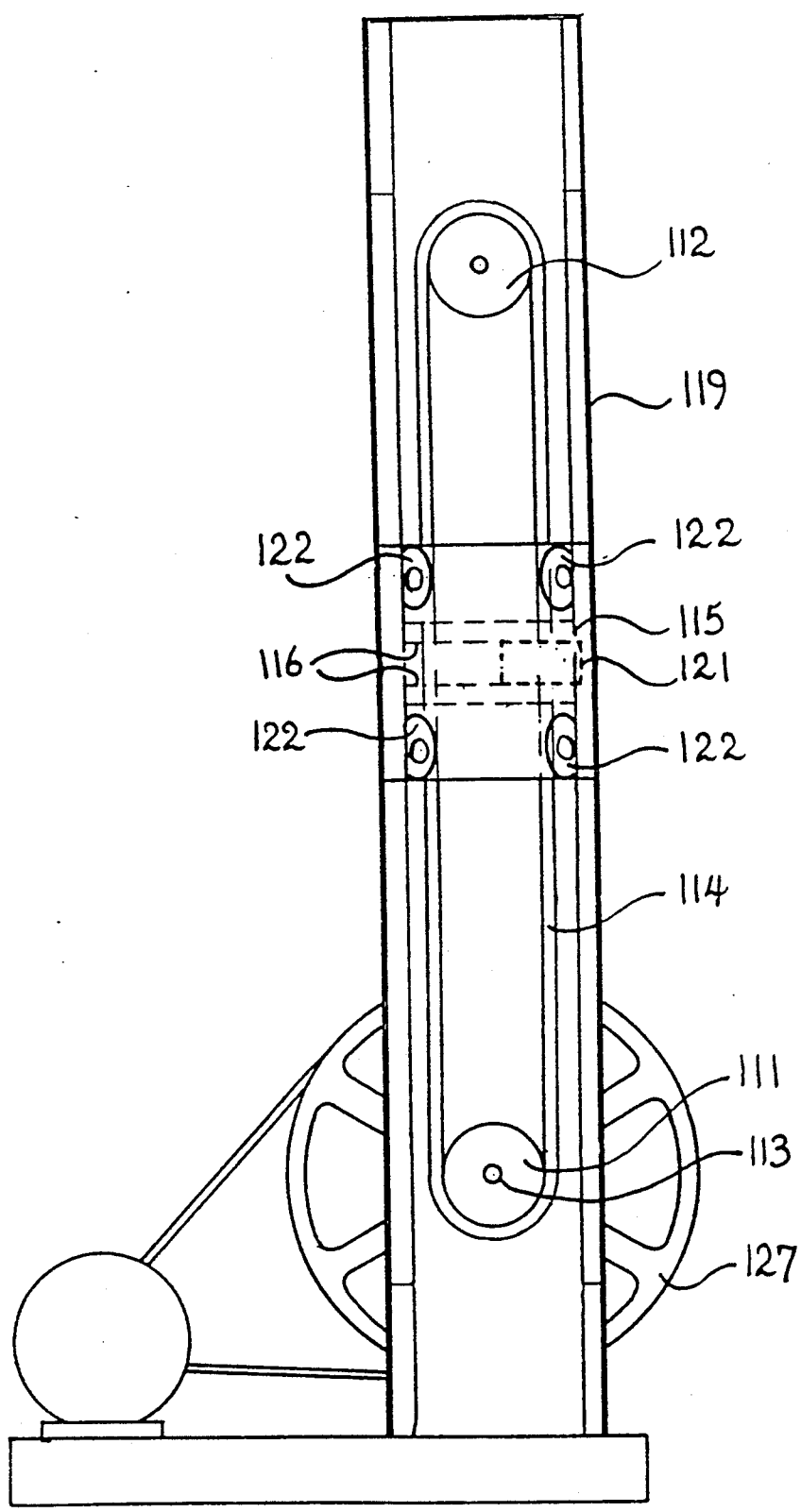
FIG. 2 is a side elevation of the second embodiment.
Figure 3:
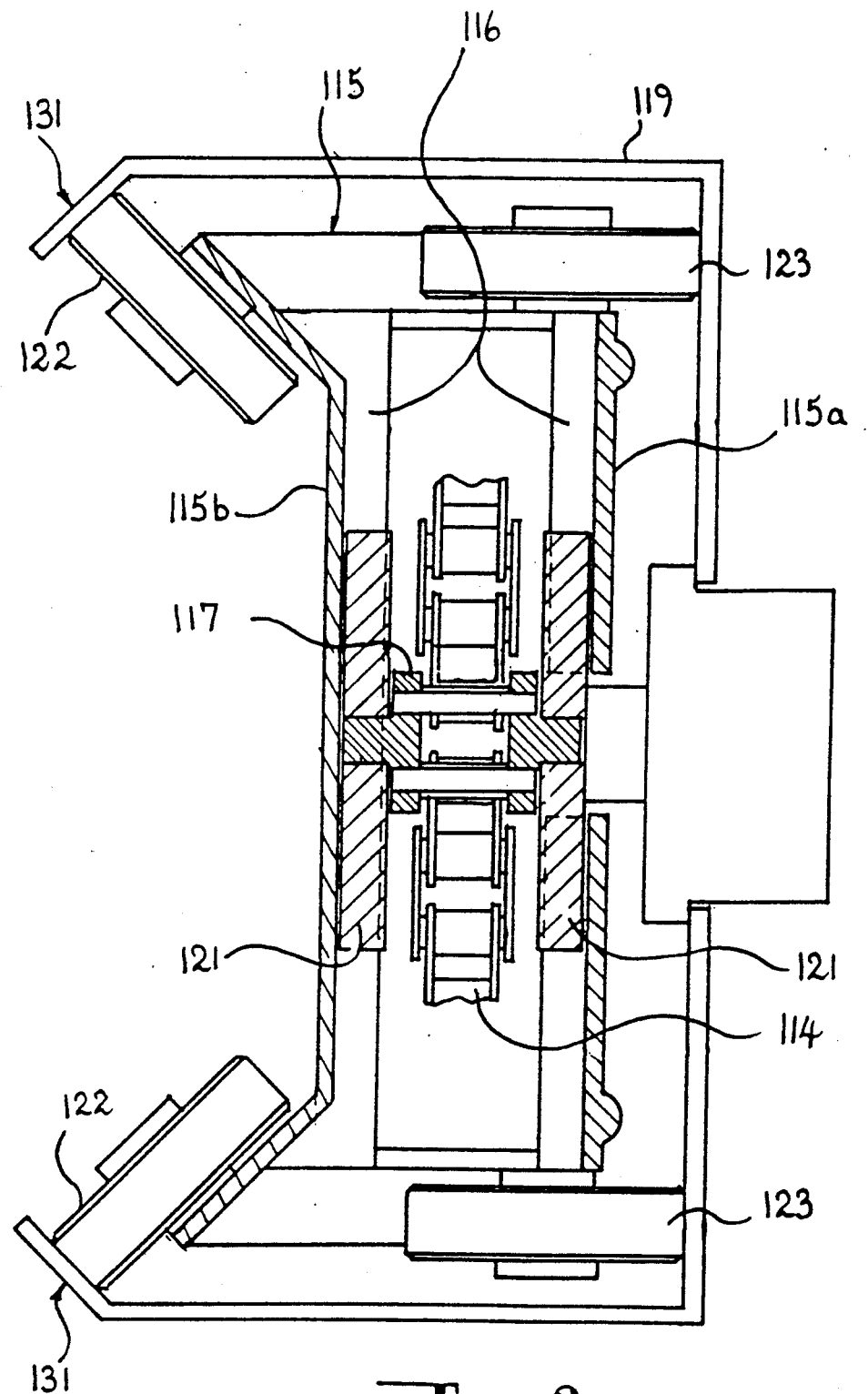
FIG. 3 is a cross-section of the second embodiment.
Figure 4A:
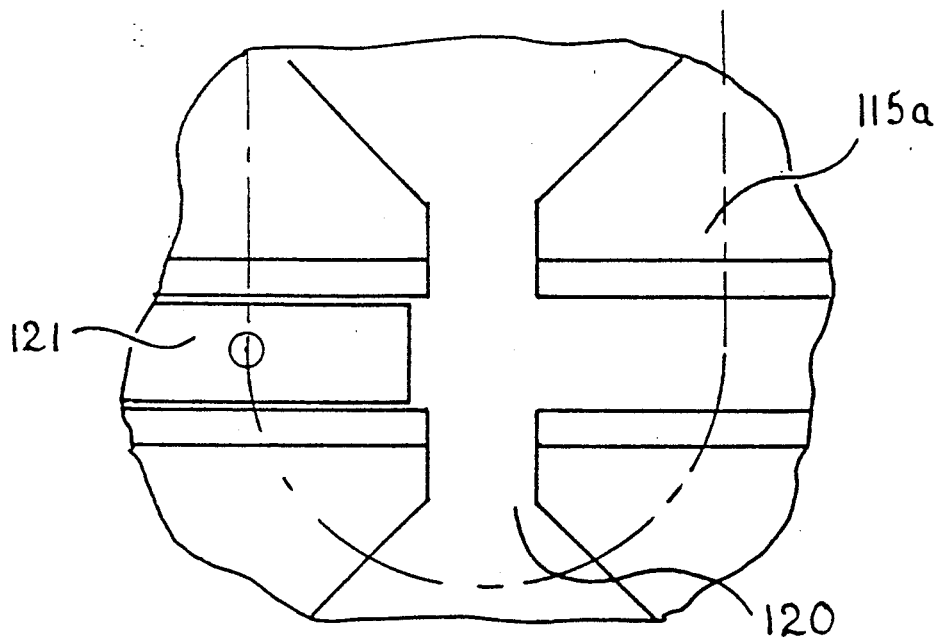
FIG. 4A through 4D are a series of part sectional elevations of the carrier of the second embodiment illustrating the movement of the slider blocks.
Figure 4B:
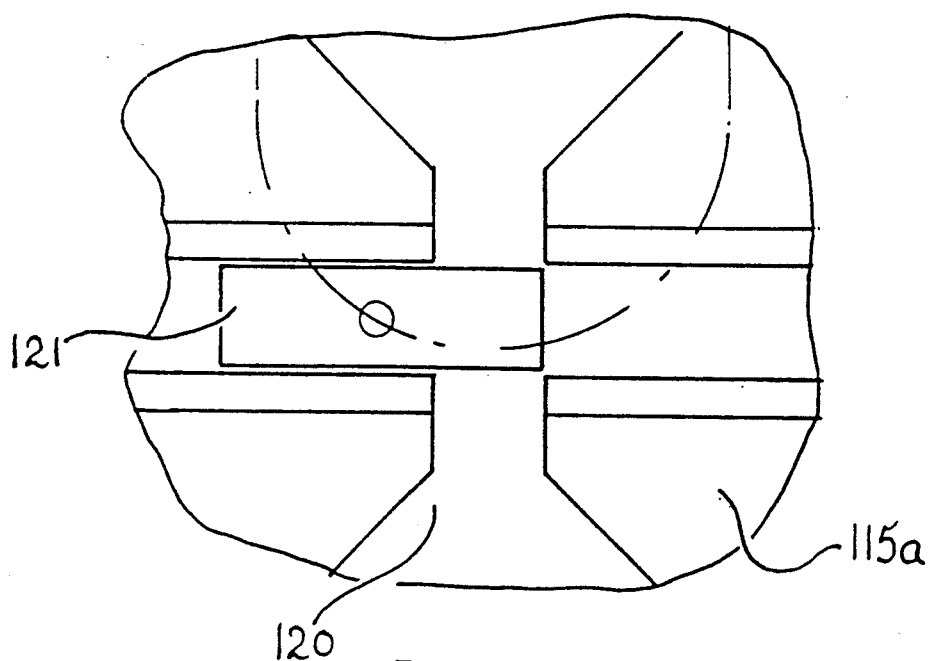
Figure 4C:
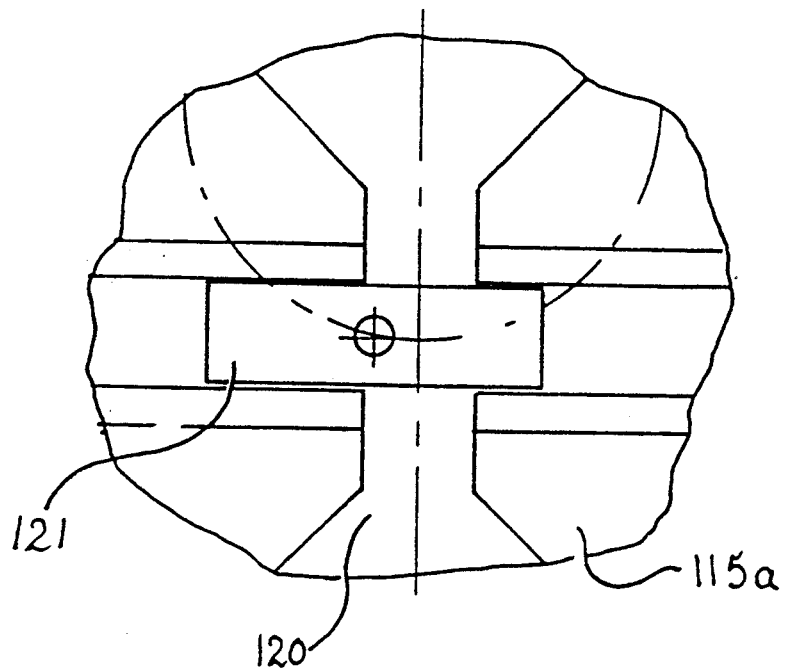
Figure 4D:
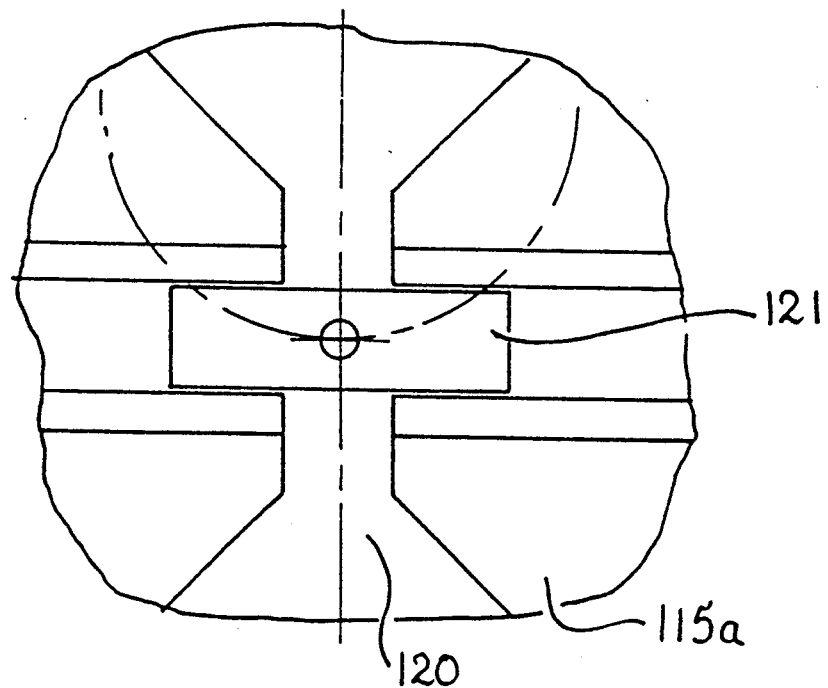
Figure 5:
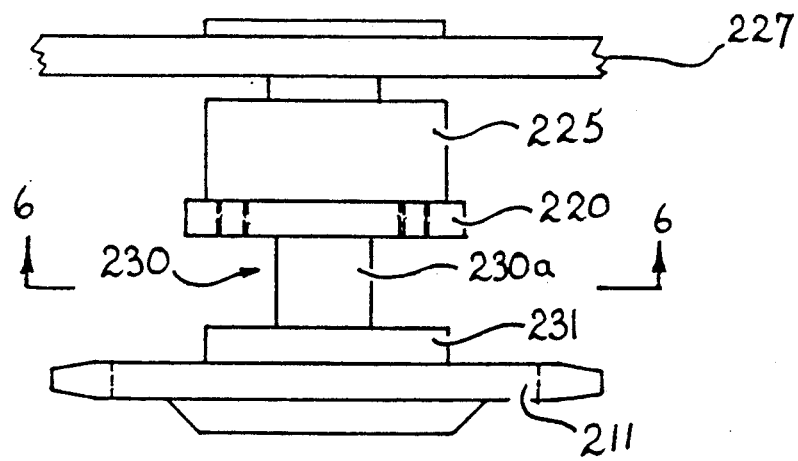
FIGS. 5 through 8 depict a mounting shaft structure in accordance with the second embodiment of the invention; wherein like numerals represent like features of the invention.

The second embodiment as shown at FIGS. 2, 3 and 4 comprises a pair of wheels 111 and 112 whereby one wheel 111 is driven from a rotary power source through a drive shaft 113 and the other wheel is freely rotatable on an idler shaft. Both wheels 111 and 112 are associated with a housing body 119 having a central axis which is substantially parallel with the axis interconnecting the axes of rotation of the wheels 111 and 112. The housing body 119 comprises a rectangular channel section having obliquely inwardly directed flanges 131 at the edges. A cover plate (not shown) may be fixed to its open face if desired. The housing body supports a carrier 115 which extends transversely across the support and which substantially lies to both sides of the drive member 114 to provide two parallel transversely extending side portions 115a and 115b. The opposed faces of the side portions 115a and 115b are each formed with a track 116 which extends along both side portions and which is formed as a channel in the opposed faces of the side portions 115a and 115b. The drive member 114 supports at a point along its length a slider 117 which takes the form of a fixture with a protruding shaft fixed to the flexible drive member and which extends equally over the flexible drive member transverse thereto. The shaft supports a slider block 121 at each end. The slider blocks 121 are received in the channels 116 in the side portions 115a and 115b. The one side portion 115a which is located to the side of the wheels 111 and 112 having the shafts fixed thereto is formed with a gap 120 transverse to the axis of the track whereby on movement of the carrier 115 past the shafts, the shafts are received in the gap 120. The length of the slider blocks are such that on the slider block moving along the track when the portion of the drive member 114 engages either of the wheels 111 or 112, and the slider block engages the opening in the one transversely extending portion of the slider carrying the shaft does not enter the opening until the leading edge of the slider is engaged with the opposite side of the slot as shown at FIGS. 4a, b, c and d. As a result both sides of the shaft are constantly supported by the tracks 116 and subjected to the same forces which counteract any inertial forces and/or gravitational forces and/or other forces exerted thereon. If desired guide members similar to the guide members 18 of the first embodiment may be provided at each end position of the carrier to fill the gap 120 on the carrier reaching its end position.

With rotation of the drive shaft 113 the wheel 111 is caused to rotate and the idler wheel 112 is caused to rotate through the presence of the flexible drive member 114. As a result of the movement the flexible drive member 114 the slider 117 is carried in the direction of movement of the drive member causing the carrier also to be moved. On the slider reaching one of the wheels 111 it will be caused to move from one side of the wheel to the other side with further rotation of the wheels and this transverse movement of the slider 117 is accommodated through the engagement of the slider blocks 121 of the slider in the tracks 116 in each side portion 115a and 115b of the carrier whereby on the slider reaching the other side of the wheel it will be carried in the opposite direction to that previously produced to take the carrier with it.

The carrier 115 of the second embodiment is supported to facilitate its axial movement in the housing body 119 by a set of rollers. The rollers comprise a first set of four rollers 122 located on the outer face of the carrier adjacent the open face of the housing body. The rollers are positioned at the corners of the outer face of the carrier and are directed obliquely from the carrier to be received against the flanges 131 provided at the open face of the housing body innerfaces.

The second set of rollers comprise a pair of rollers 123 located to each side of the carrier and extending from the innermost face. One roller 123a is located uppermost on the carrier while the other roller 123b is located lowermost on the carrier. Both of the rollers substantially engage the internal face of the housing body 119.

The housing body may comprise a formed channel section formed from mild steel sheeting. The rollers 122 and 123 are mounted to be adjustable in their radial movement to accommodate dimensional tolerances of the housing. In the event of there being any discontinuities in the dimensions of the housing body such discontinuities are accommodated by the resilience of the channel section. In addition such resilience can be used to provide some preloading on the rollers in the carrier to eliminate lateral movement of the carrier in the housing body. If desired the housing body may be formed as a box section.

Figure 6:
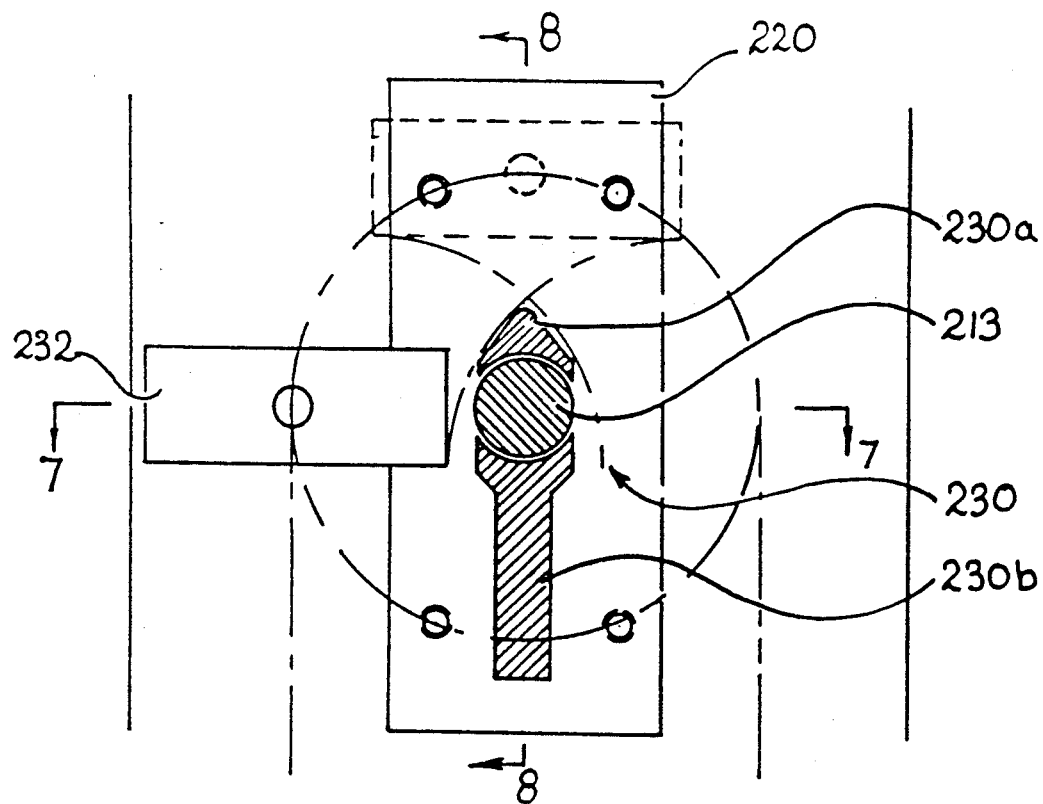
Figure 7:
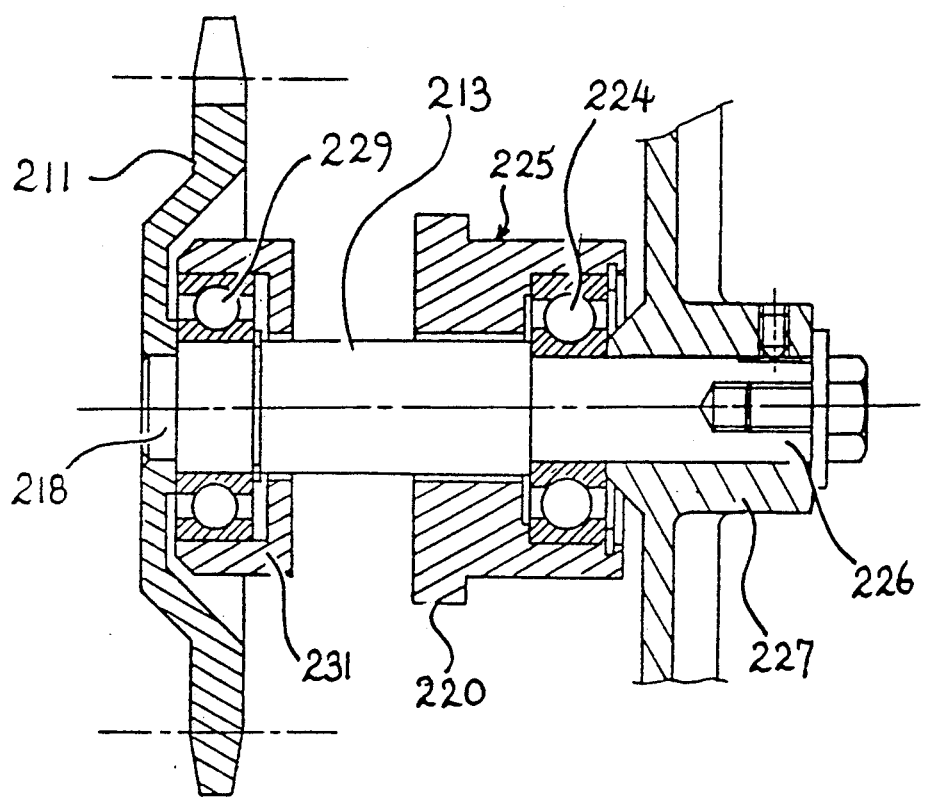
Figure 8:
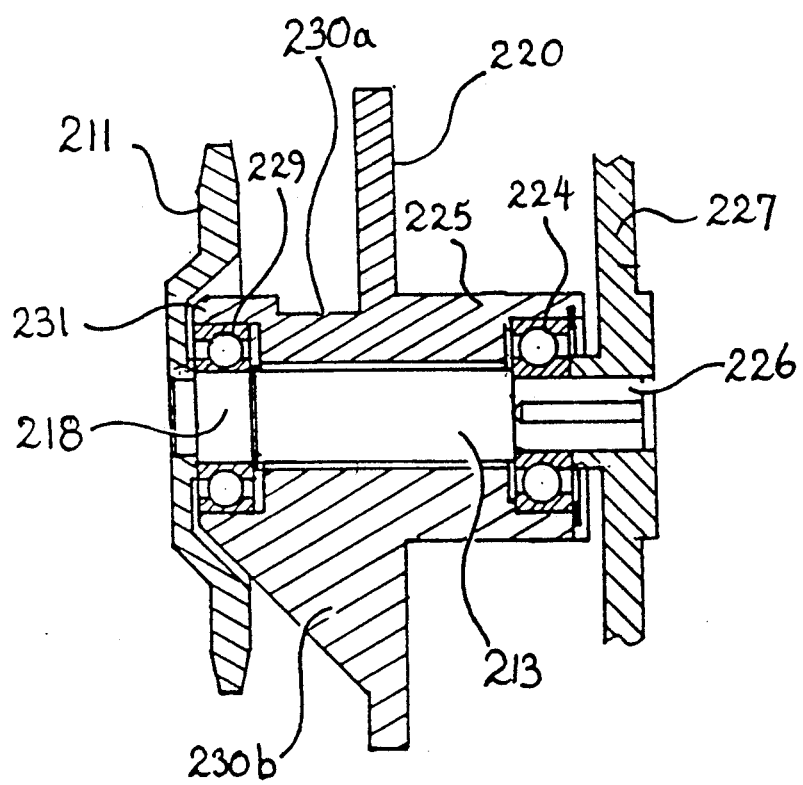

The mounting for the shafts second embodiment, as set out in FIGS. 2 through 4, is shown in FIGS. 5, 6, 7 and 8; wherein like numerals represent like features of the invention. Each shaft 213 is supported in the housing member 220 by a first internal bearing 224 supported within a bearing housing 225 extending from the rear face and has a pulley wheel 227 fixed to it. The inner end 218 of the shaft 213 has a wheel 211 fixed thereto and is supported from the housing member by an internal bearing 229 located in a bearing housing 231 located at the end of a boss 230 extending from the internal face of the housing member 220. The boss comprises a pair of vertically spaced portions 230a and 230b which define between themselves a journal space shaped to accommodate the shaft 213. The transverse dimension of the boss is substantially equal to the diameter of the shaft resulting in the sides of the shaft being exposed. The lower portion 230b of the boss is formed as a downwardly extending gusset between the housing member 220 and the second bearing 229. The upper portion 230a has a profiled upper portion conforming to the path of the most adjacent portion of the slider block 232 as it moves around the boss as shown at FIG. 6 with movement of the shaft supported thereby around the wheel 211.

A suitable application of the invention relates to a pump utilising a piston. An advantage of the embodiment resides in the capacity to supply motion for long stroke pumps utilising a piston.

It should be appreciated that the scope of the present invention need not be limited to the particular scope of the embodiment described above. In particular the invention need not be limited to a rotary to reciprocatory motion converter but is equally applicable to a reciprocatory to rotary motion converter. In addition the engagement between the wheels and endless flexible member may take any suitable form and need not be limited to a chain and toothed wheel relationship described in relation to the embodiment. In addition the housing body may take any suitable form to support the carrier in its reciprocation between the wheels. In its support by the housing body the carrier can be slidably supported by any suitable means. Furthermore if desired both shafts may be driven to provide the reciprocatory movement of the carrier or may both be driven as a result of reciprocation by the carrier.

We claim:

1. A continuous rotary to reciprocatory or reciprocatory to rotary motion converter comprising a pair of wheels in spaced co-planar relationship to each other and having an endless flexible drive member received over them, a carrier located about the outer perimeter of the drive member, and a primary slot extending transversly across said carrier and a secondary slot intersecting said primary slot to clear a shaft of at least one of said wheels when the carrier is in proximity to said one of said wheels, and a slider connected to said drive member, said slider extending across the outer width of said drive member and reciprocating within said primary slot from one side thereof to the other side thereof for movement with the drive member and transverse movement relative to an axis extending between the wheels whereby with movement of the drive member over the wheels, said slider traversing said secondary slot as said drive member passes across said one of said wheels, and support means for supporting the slider within the carrier as said slider traverses said secondary slot.

2. A motion converter as claimed in claim 1 wherein the slider is engageable with the carrier through at least one roller rotatably supported from the slider and received in the carrier for said transverse movement.

3. A motion converter as claimed in claim 1 wherein the slider is engagable with the carrier through at least one slider block slidably supported from the carrier for said transverse movement.

4. A motion converter as claimed in claim 3 wherein the wheels are supported from a base by a shaft extending to at least one side of the wheel and the portion of the carrier located to at least one side of the carrier being formed with a gap to enable the carrier to reciprocate past the shaft.

5. A motion converter as claimed in claim 4 wherein said support means includes said slider blocks being of sufficient length that the distance between the mounting of the slider to the slider blocks and each ends of the slider block is greater that the width of the gap.

6. A motion converter as claimed in claim 1 wherein the wheels are supported from a base by a shaft extending to at least one side of the wheel and the portion of the carrier located to at least one side of the carrier being formed with a gap to enable the carrier to reciprocate past the shaft.

7. A motion converter as claimed in claim 6 wherein the support means comprises a guide member supported adjacent to each wheel which is receivable in said gap on said carrier moving past said shaft to its respective end position said guide member being formed to receive the slider in its passage across the gap.

8. A motion converter as claimed in claim 7 wherein the guide member is capable of resilient movement with the carrier in the direction of said axis when engaged with the carrier.

9. A motion converter as claimed in claim 1 wherein the wheels are supported at spaced locations on an elongate base and said carrier is guided by the base for axial movement thereon.

10. A motion converter as claimed in claim 9 wherein the elongate base is formed of a channel shaped section having inwardly directed flanges at the edges.

11. A motion converter as claimed in claim 10 wherein the channel shaped section comprises a formed-sheet metal section.

12. A motion converter as claimed in claim 10 wherein the channel shaped section comprises an extruded section.

13. A motion converter as claimed in claim 10, wherein the carrier is guided by the inner face of the channel shaped section by rollers mounted to the carrier.

14. A motion converter as claimed in claim 12 wherein the wheels are adjustable on the carrier to vary the degree of outward extension from the carrier.

15. A continuous rotary to reciprocatory motion converter as claimed in claim 1 wherein at least one wheel is driven to cause reciprocation of the carrier.

16. A continuous rotary to reciprocatory motion converter as claimed in claim 1 wherein the carrier is caused to reciprocate to cause motion of the wheels.

* * * * *